Feb. 14, 1933.　　　　G. L. McKEE　　　　1,897,319
HOSE COUPLING
Filed Dec. 2, 1925
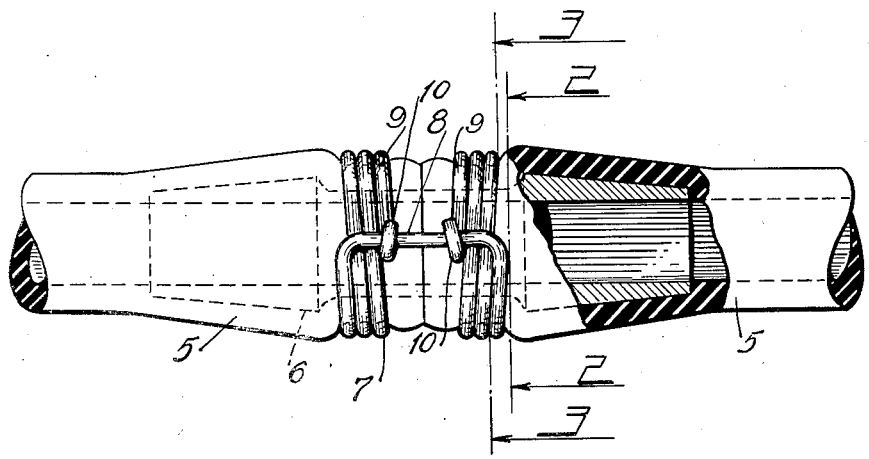
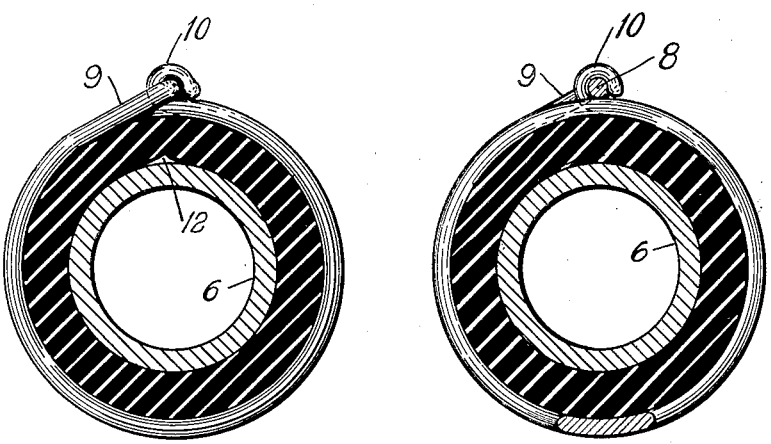
　　　
INVENTOR.
Glenn L. McKee
BY Rollander & Stratton
ATTORNEYS.

Patented Feb. 14, 1933

1,897,319

UNITED STATES PATENT OFFICE

GLENN L. McKEE, OF JEROME, ARIZONA, ASSIGNOR, BY DIRECT AND MESNE ASSIGNMENTS, TO HOSE STAYPUT TOOL COMPANY, OF DENVER, COLORADO, A CORPORATION OF COLORADO

HOSE-COUPLING

Application filed December 2, 1925. Serial No. 72,661.

This invention relates to hose-couplings and its primary object is to provide in a hose-coupling, a clamp which when applied exteriorly of a flexible hose produces a fluid-tight connection between the hose and a pressure-resisting sleeve within the same.

With this object in view, the coupling comprises a pliable band turned repeatedly in circular form and having its ends interlocked whereby in addition to a convolution composed of the extreme portions of the band, there is in adjacency to the same one or more continuous convolutions which cooperate with the other to produce the fluid-tight joint. The function of the continuous convolution or convolutions is to close any space between the hose and the interior sleeve, formed by the interlocking connection of the end portions of the other convolution. The coupling may be applied to a single hose section, or simultaneously to two hose sections assembled upon one and the same sleeve as will hereinafter be more fully described.

In the accompanying drawing in the three views of which like parts are similarly designated, Figure 1 represents the coupling as applied to two hose-sections in end-to-end relation upon a tubular connector, Figure 2, an enlarged section along the line 2—2, Figure 1, and Figure 3, an enlarged section taken on the line 3—3, Figure 1.

Referring further to the drawing, the numeral 5 designates two hose-sections placed end-to-end upon a tubular connector 6. The connector is as usual provided with tapering heads around which the flexible material of the hose is drawn by the application of the coupling.

The coupling is preferably composed of pliable wire, although within the scope of the invention, it may be made of a flat or otherwise formed flexible band.

For the simultaneous connection of two hose-sections upon one and the same connector, as illustrated in Figure 1, the coupling is composed of a band 7 of U-shaped form having a bight 8 between two leg-members 9. The leg-members are turned repeatedly in circular form to embrace the hose-sections, one of the turns being composed of the extreme portion of the band at which the bight is formed, and the opposite extreme portion composed of the free ends of the leg-members.

The ends of the hose-sections are inserted in the coils of the coupling, after which the extreme portions of the band are drawn together and interlocked by bending the free ends of the leg-members around the bight, as shown at 10 in the drawing.

The application of the coupling is accomplished by means of mechanical devices which have been made the subjects of two co-pending applications for patent.

When the terminal portions of the band are drawn together and bent one upon another for interlocking engagement, they draw the rubber or other flexible material of which the hose is composed, away from the connector thereby producing a space, shown at 12 in Figure 2, through which fluid conveyed through the hose may leak around the connector, and it is the function of the continuous convolution or convolutions adjacent those composed of the extreme portions of the band to close these spaces and thereby perfect and insure the fluid-tight joint between the hose-sections and the connector, as has been shown in Figure 3.

It will be understood without further illustration that in order to fasten a single hose-end upon a sleeve inserted thereinto, only one half of the coupling, as shown in Figure 1, is needed. In other words, the two ends of the wire of which the band is composed will be hooked together, and the convolution of the intermediate portion of the wire provides the complete and continuous turn which closes the gap between the hose and the sleeve formed when the ends are drawn past one another and hooked together.

Having thus described my invention what I claim and desire to secure by Letters Patent is:

1. As a new article of manufacture a hose repair comprising, in combination, a rigid sleeve telescoped within the meeting ends of pieces of hose and an initially U-shaped flexible member having its initially parallel portions wrapped a plurality of times about the adjacent ends of the hose, the free ends of said member passed through the bight thereof and pulled taut, said free ends passed under said bight portion and bent over the material thereof, whereby to secure said flexible member in position, the portion of said flexible member adjacent said bight being thereby brought across said wraps and frictionally engaging the same.

2. A hose coupling comprising in combination with two end to end disposed hose sections and a hollow connector within the same, a clamping element composed of a flexible band of U-shaped form, having a bight between two leg-members, said leg-members being turned repeatedly around the hose-sections and having their free ends interlocked with the bight, upon the same, whereby to provide for each section, a convolution inclusive of the terminal portions of the respective leg-member and adjacent thereto, a convolution of an intermediate portion of the same, the convolutions cooperating to clamp the hose-section in fluid-tight contact with the connector.

3. As a new article of manufacture, a clamp for hose-couplings comprising a flexible band of U-shaped form, having a bight between two leg-members, the leg-members being turned repeatedly in circular form to embrace a hose, two turns being composed of the terminal portions of the leg-members, the free extremities of which are adapted for interlocking connection with the bight, and other turns adjacent the others, being composed of intermediate portions of the leg-members.

4. A coupling comprising in combination, a hose-section, a hollow pressure-resisting element inside an end-portion of the same, and a clamping element composed of a flexible band of U-shaped form around the hose-section where it surrounds the pressure-resisting element, the band having a bight between two leg members, turned repeatedly around the hose-section, and having their free ends interlocked with the bight, upon the same, whereby to provide a convolution inclusive of the terminal portions of the respective leg member, and adjacent thereto, an unbroken convolution of an intermediate portion of the same, the convolutions cooperating to clamp the hose-section in fluid-tight contact with the pressure-resisting element.

5. A clamp comprising a coil consisting of a wire extended substantially twice around the member to be clamped, one end of said wire being formed into a loop, the other end being bent over the loop to form a lock, the intermediate convolutions of said coil crossing under the lock and ensuring the continuity and clamping pressure under said lock.

6. A clamp for the purpose described comprising coils, each consisting of a plurality of convolutions of wire, substantial extremities of certain convolutions being connected by a bridge over which remaining extremities of the convolutions are passed and bent to form a lock, intermediate convolutions providing cross over wires under the lock.

7. A clamp for the purpose described comprising a coil consisting of a plurality of convolutions of wire, one substantial extremity being bent to form a loop over which the remaining extremity passes and is bent to form a lock, the remaining continuous convolutions passing under the lock to afford continuous application of the clamping pressure upon a member to be clamped.

In testimony whereof I affix my signature.

GLENN L. McKEE.